(12) United States Patent
McColloch

(10) Patent No.: US 8,696,219 B2
(45) Date of Patent: Apr. 15, 2014

(54) PARALLEL OPTICAL COMMUNICATION MODULE CONNECTOR

(75) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 37 days.

(21) Appl. No.: 13/596,265

(22) Filed: Aug. 28, 2012

(65) Prior Publication Data

US 2014/0064676 A1    Mar. 6, 2014

(51) Int. Cl.
- *G02B 6/26* (2006.01)
- *G02B 6/36* (2006.01)
- *G02B 6/00* (2006.01)
- *H01B 13/00* (2006.01)

(52) U.S. Cl.
USPC .............................................. 385/92; 385/14

(58) Field of Classification Search
USPC ........................................ 385/14, 88–93, 147
See application file for complete search history.

(56) References Cited

U.S. PATENT DOCUMENTS

| | | | |
|---|---|---|---|
| 4,989,934 A * | 2/1991 | Zavracky et al. | 385/14 |
| 5,432,630 A * | 7/1995 | Lebby et al. | 398/116 |
| 5,539,200 A * | 7/1996 | Lebby et al. | 250/227.11 |
| 5,790,739 A * | 8/1998 | Strause | 385/135 |
| 6,123,465 A * | 9/2000 | Hashizume | 385/93 |
| 6,256,448 B1 | 7/2001 | Shahid | |
| 6,456,766 B1 * | 9/2002 | Shaw et al. | 385/47 |
| 6,896,422 B2 * | 5/2005 | Bennett et al. | 385/92 |
| 6,918,703 B2 | 7/2005 | Chen et al. | |
| 6,931,195 B2 | 8/2005 | Lemoff | |
| 7,553,091 B2 | 6/2009 | McColloch | |
| 7,905,751 B1 | 3/2011 | Davis | |
| 2003/0019838 A1 * | 1/2003 | Shaw et al. | 216/20 |
| 2007/0025666 A1 * | 2/2007 | Shibata et al. | 385/78 |

* cited by examiner

*Primary Examiner* — Akm Enayet Ullah

(57) ABSTRACT

An optical connector includes a connector housing and an optics device. A plurality of optical fibers are retained in a fiber port of the connector. The fiber port has two fiber guide arrays oriented at an angle with respect to each other. Portions of the fibers between the two fiber guide arrays flex as the optics device and connector housing are assembled together. The resilient force of the flexed fibers maintains the fiber ends seated within the fiber guide arrays to facilitate further handling, such as applying an adhesive to further secure the fiber ends in the connector.

17 Claims, 11 Drawing Sheets

PARALLEL OPTICAL COMMUNICATION MODULE CONNECTOR

BACKGROUND

In an optical communication system, it is generally necessary to couple an optical fiber to an opto-electronic transmitter, receiver or transceiver device and to, in turn, couple the device to an electronic system such as a switching system or processing system. These connections can be facilitated by modularizing the transceiver device. Such optical transceiver modules include a housing in which are mounted opto-electronic elements, optical elements, and electronic elements, such as one or more light sources (e.g., lasers), light sensors (e.g., photodiodes), lenses and other optics, digital signal driver and receiver circuits, etc. In addition, a transceiver module typically includes an optical connector that can be coupled to a mating connector at the end of a fiber-optic cable.

Various optical transceiver module configurations are known. For example, a configuration commonly referred to as "Small Form Factor Pluggable" or SFP refers to a transceiver module having an elongated housing with a rectangular cross-sectional shape, where the rear of the module has an electrical connector that plugs into a bay of a front-panel cage, and the front of the module has an optical connector that accepts an optical fiber plug. Another module configuration, for example, is commonly referred to as "mid-plane" mounting. A mid-plane mountable transceiver module includes an electrical connector, such as a Landing Grid Array (LGA) or a MEGARRAY™, which are mountable on the surface of a printed circuit board. Mid-plane mountable transceiver modules include "parallel" transceivers that transmit and receive multiple optical signals in parallel, using arrays of light sources and light sensors.

One type of mid-plane mountable transceiver module system includes a transceiver and an optical connector that attaches to the transceiver module. The transceiver module includes an opto-electronic system that transmits and receives optical signals (i.e., beams) in a direction normal to the PCB on which the transceiver module is mounted. The optical connector interfaces with or connects to the top of the transceiver module. The optical connector includes reflective optics that redirect parallel optical signals emitted by the transceiver module into the ends of some of the optical fibers of a ribbon cable and redirect parallel optical signals emitted from the ends of others of the ribbon cable optical fibers into the transceiver module.

Manufacturing the above-referenced type of mid-plane mountable optical transceiver can present various challenges. Among such challenges are providing economical manufacturing methods while ensuring that the ribbon cable optical fibers are precisely aligned with the reflective optics in the optical connector. It would be desirable to provide an improved optical connector for such a transceiver module and a method for making the optical connector.

SUMMARY

Embodiments of the present invention relate to an optical connector attachable to an optical transceiver module mounted on a surface of a circuit board and a method for making the optical connector. In an exemplary embodiment, an optical connector includes a connector housing and an optics device connected to the connector housing.

The connector housing has a bottom portion that is mechanically and optically mateable with an upper portion of the optical transceiver module. This bottom portion defines a reference plane parallel to the surface of the circuit board when the optical connector is attached to the optical transceiver module.

The optics device has a reflective element configured to redirect two or more parallel optical beams at an angle of at least about 90 degrees between a first axis and a second axis, where the first axis is oriented normal to the reference plane and extends between the reference plane and the reflective element, and the second axis extends between the reflective element and a fiber port. The fiber port has two or more elongated parallel proximal fiber guides adjacent the reflective element and a corresponding number of elongated parallel distal fiber guides. The proximal fiber guides and distal fiber guides are oriented at a non-zero angle with respect to each other.

In an exemplary embodiment, a method for making the optical connector includes providing a connector housing and an optics device that is connectable to the connector housing. The connector housing has a bottom portion that is mechanically and optically mateable with an upper portion of the optical transceiver module. This bottom portion defines a reference plane parallel to the surface of the circuit board when the optical connector is attached to the optical transceiver module. The optics device has a reflective element configured to redirect two or more parallel optical beams at an angle of at least about 90 degrees between a first axis and a second axis, where the first axis is oriented normal to the reference plane and extends between the reference plane and the reflective element, and the second axis extends between the reflective element and a fiber port. The fiber port has two or more elongated parallel proximal fiber guides adjacent the reflective element and a corresponding number of elongated parallel distal fiber guides. The proximal fiber guides and distal fiber guides are oriented at a non-zero angle with respect to each other.

The method further includes inserting a plurality of optical fibers into the fiber port past the distal fiber guides until the optical fiber ends of the plurality of optical fibers reach the proximal fiber guides. The method still further includes securing the plurality of optical fibers in the fiber port in an orientation in which optical fiber ends are retained in the proximal fiber guides and aligned along the second axis, and a portion of the plurality of optical fibers are retained in the distal fiber guides in an orientation at a non-zero angle with respect to the second axis.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
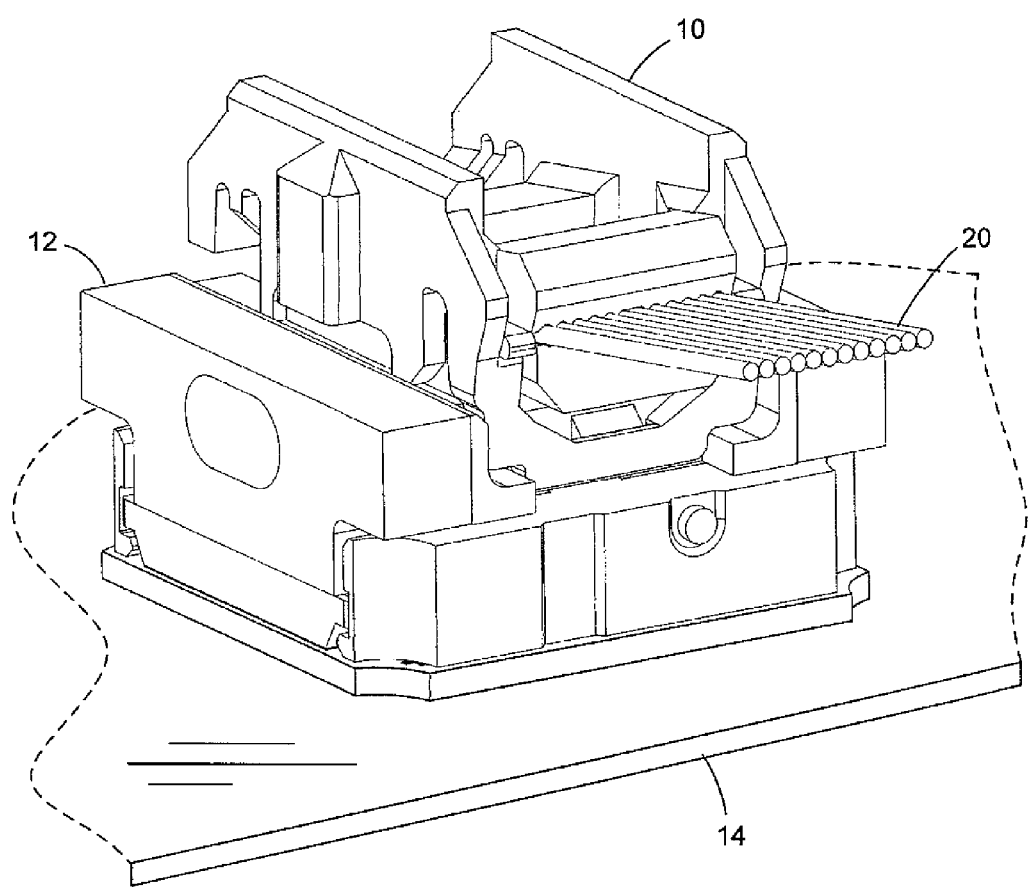
FIG. 1 is a perspective view of an optical connector in accordance with an exemplary embodiment of the invention, showing the connector attached to an optical transceiver module mounted on a surface of a circuit board.
Figure 2:
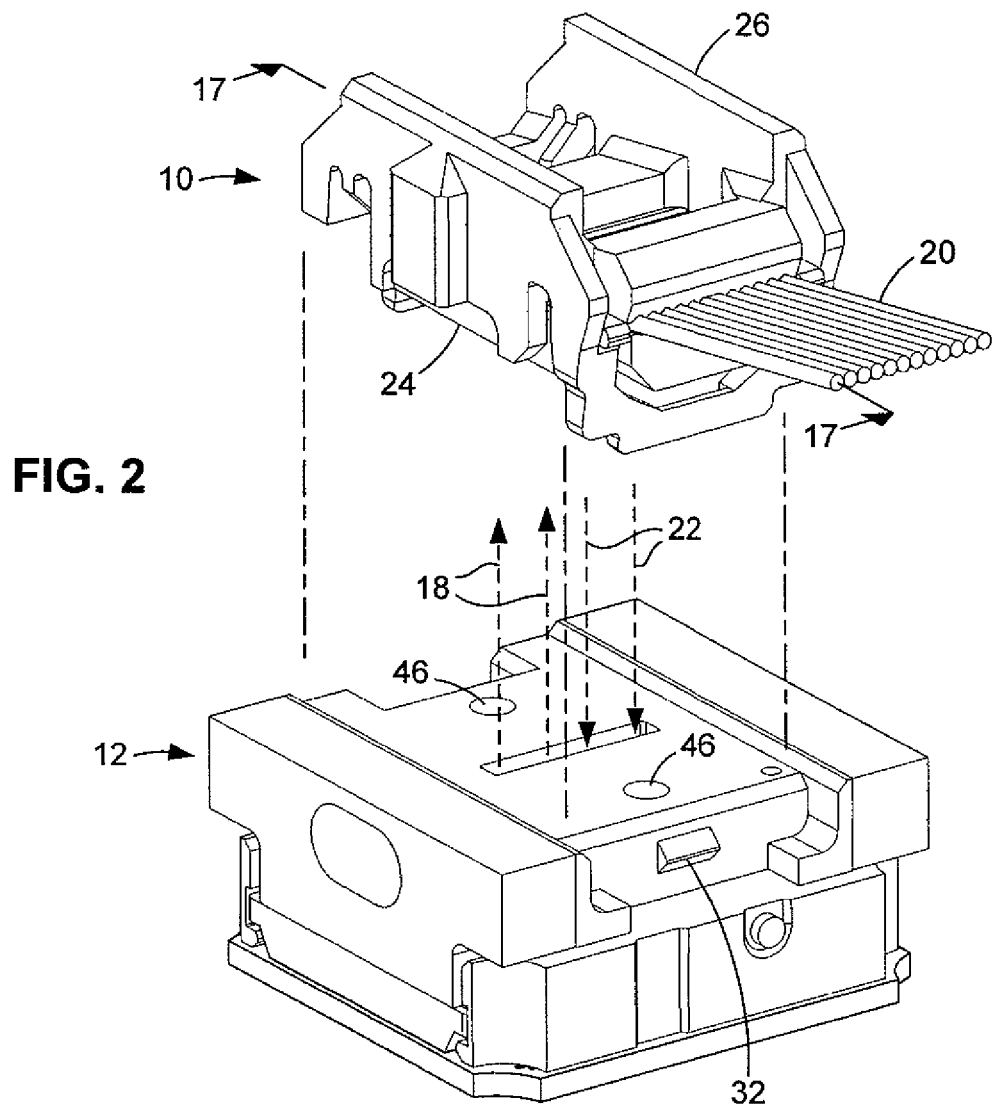
FIG. 2 is similar to FIG. 1, showing the optical connector separated from the optical transceiver module.
Figure 3:
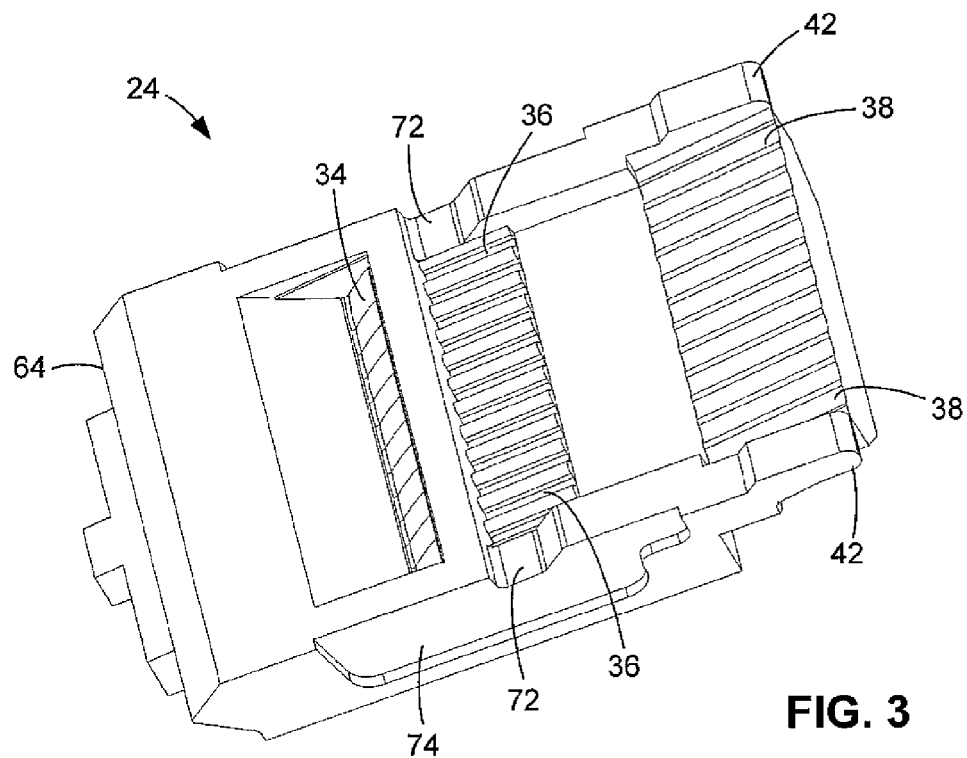
FIG. 3 is a top perspective view of an optics device of the optical connector of FIGS. 1-2, with a cover removed to reveal the reflective element.
Figure 4:
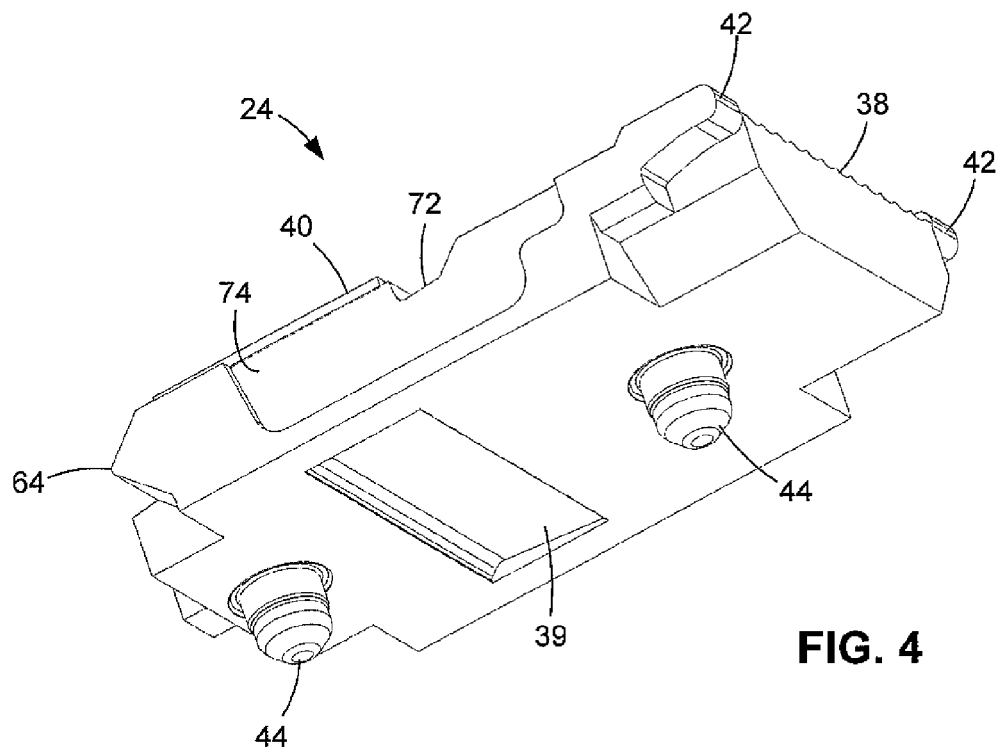
FIG. 4 is a bottom perspective view of the optics device of FIG. 3.
Figure 5:
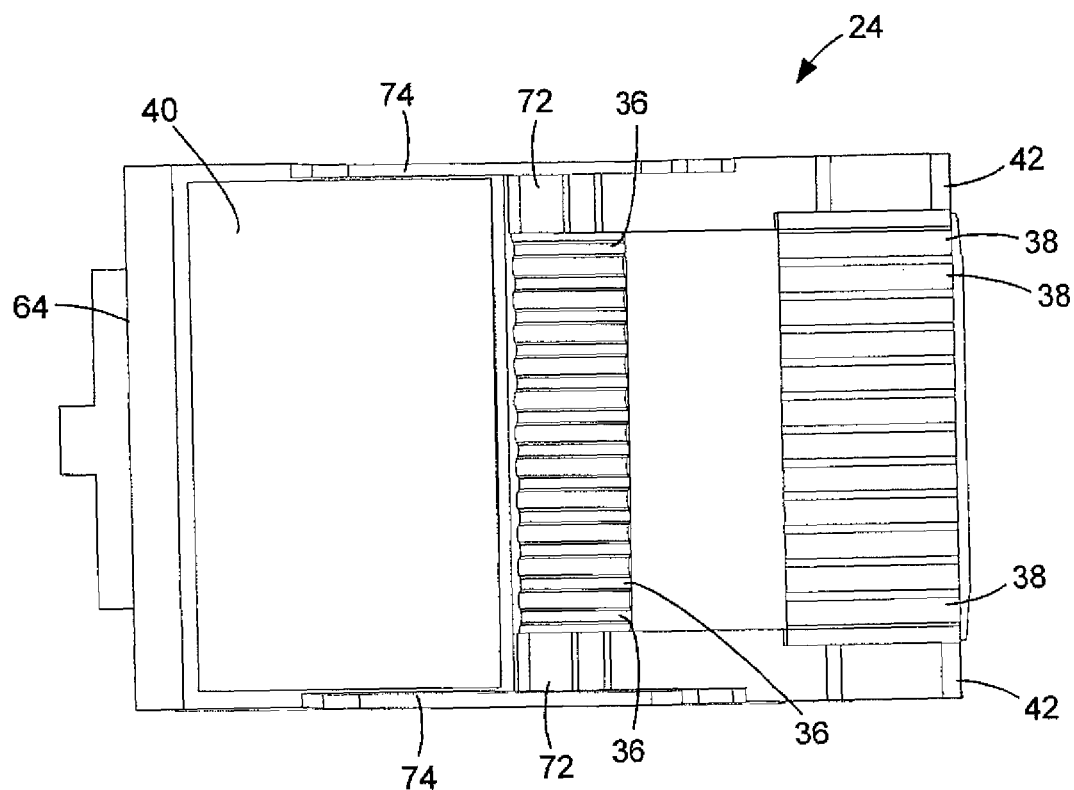
FIG. 5 is a top plan view of the optics device of FIGS. 3-4.
Figure 6:
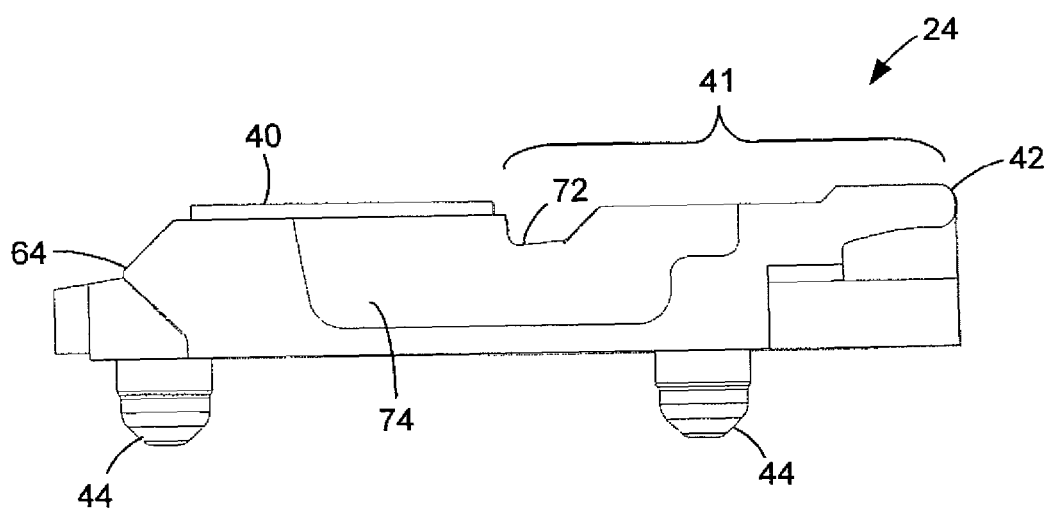
FIG. 6 is a side elevation view of the optics device of FIGS. 3-5.

As illustrated in FIGS. 1-2, in an illustrative or exemplary embodiment of the invention an optical connector 10 is attached to a parallel optical transceiver module 12. Parallel optical transceiver module 12 is of a known type, which persons of ordinary skill in the art are readily capable of providing. Accordingly, details of parallel optical transceiver module 12 are not described herein. It can be noted that parallel optical transceiver module 12 can be mounted on a printed circuit board (PCB) 14 and can communicate electrical signals with conductors of PCB 14, although for purposes of clarity neither the conductors nor the array of electrical contacts on the bottom surface of parallel optical transceiver module 12 that facilitate such signal communication are shown in FIGS. 1-2. As will be apparent to persons skilled in the art, such a PCB 14 is part of a suitable known external system (not shown), such as a processing system, switching system, etc., which can send and receive data via parallel optical transceiver module 12 but which is otherwise not relevant to the subject matter described herein.

As well understood by persons skilled in the art, parallel optical transceiver module 12 includes electrical-to-optical signal conversion circuitry that converts electrical signals received from PCB 14 into outgoing (transmit) optical signals 18 (FIG. 2). Optical connector 10 conveys outgoing optical signals 18 from parallel optical transceiver module 12 to a fiber-optic ribbon cable 20. Optical connector 10 also conveys incoming (receive) optical signals 22 (FIG. 2) that it receives via fiber-optic ribbon cable 20 to parallel optical transceiver module 12. As also well understood by persons skilled in the art, parallel optical transceiver module 12 includes optical-to-electrical signal conversion circuitry that converts these incoming optical signals 22 into electrical signals that parallel optical transceiver module 12 then provides to PCB 14. Note that parallel optical transceiver module 12 is referred to as being "parallel" because it can transmit two or more optical signals in parallel and receive two or more optical signals in parallel. For example, parallel optical transceiver module 12 can have four transmit channels and four receive channels. Each optical fiber of fiber-optic ribbon cable 20 carries one such transmit or receive channel. It should be understood that although in the exemplary embodiment the optical fibers carrying such channels are those of fiber-optic ribbon cable 20, in other embodiments the optical fibers can be individual and not part of a ribbon cable, or can be part of several cables or other similar optical fiber structures.

As further illustrated in FIG. 2, optical connector 10 includes an optics device 24 and a connector housing 26 that are assembled together as described below. To connect or attach the fully assembled optical connector 10 to parallel optical transceiver module 12 (i.e., the position shown in FIG. 1), optical connector 10 is placed on top of parallel optical transceiver module 12 and secured as described below.

As illustrated in FIGS. 3-6, optics device 24 has a reflective element 34 (FIG. 3), an array of elongated parallel proximal fiber guides 36 adjacent reflective element 34, and an array of elongated parallel distal fiber guides 38 farther from reflective element 34 that extend to one end of optical connector 10 when optics device 24 is assembled with connector housing 26 to form optical connector 10. A cover 40 (removed in FIG. 3 to reveal reflective element 34) is attached to the top of optics device 24 to protect reflective element 34 against contamination by airborne particles or other matter that could impair its optical reflectivity. Cover 40 can comprise, for example, a sticker that is adhered to the top surface of optics device 24. Reflective element 34 can comprise, for example, an array of total internal reflection (TIR) sub-elements aligned with adjacent corresponding ends of elongated parallel proximal fiber guides 36. An anti-reflection optic 39 (FIG. 4), described in further detail below, is disposed in the bottom of optics device 24.

Each elongated parallel proximal fiber guide in the array of elongated parallel proximal fiber guides 36 and each elongated parallel distal fiber guide in the array of elongated parallel distal fiber guides 38 is generally trough-shaped or groove-shaped. As described below, the array of elongated parallel proximal fiber guides 36 and the array of elongated parallel distal fiber guides 38 are oriented with respect to each other in a manner that promotes seating of the above-referenced optical fibers in the trough-shaped fiber guides or grooves. The combination of the array of elongated parallel proximal fiber guides 36 and the array of elongated parallel distal fiber guides 38, including the region or space between them and the region or space immediately above, generally defines a fiber port 41 (FIGS. 5-6) that receives fiber-optic cable 20 as described below.

One end of optics device 24 has a pair of projecting cam followers 42. A pair of bosses 44 project from the bottom of optics device 24. The pair of bosses 44 fit snugly within a corresponding pair of bores 46 (FIG. 2) in the top of parallel optical transceiver module 12 to align optical connector 10 with parallel optical transceiver module 12 during attachment. Optics device 24 can be made in a single or unitary piece by, for example, molding it from a plastic material that is transparent to the optical signal wavelengths.

Figure 7:
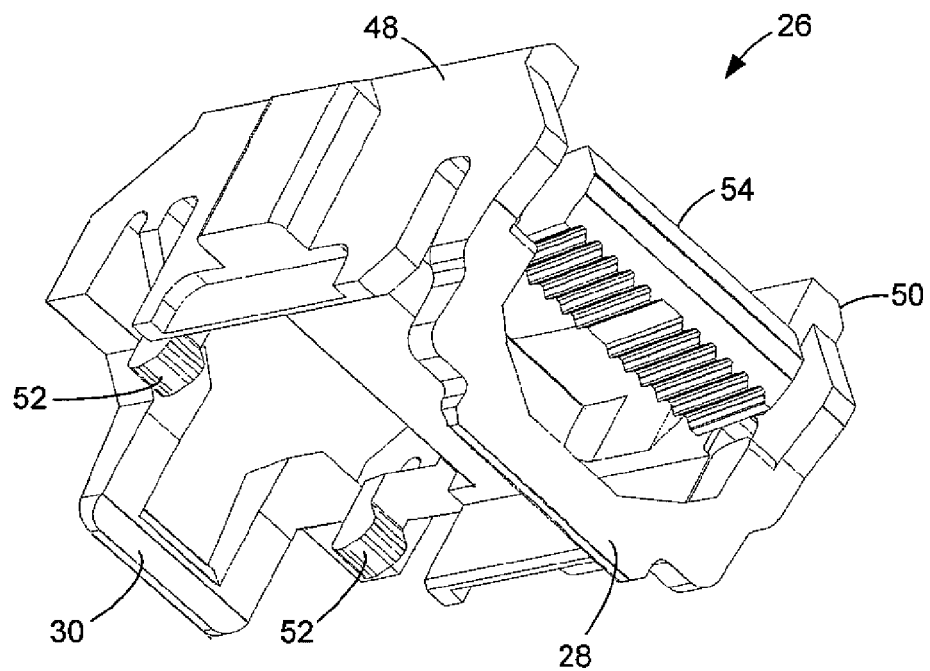
FIG. 7 is a bottom perspective view of a connector housing of the optical connector of FIGS. 1-2.
Figure 8:
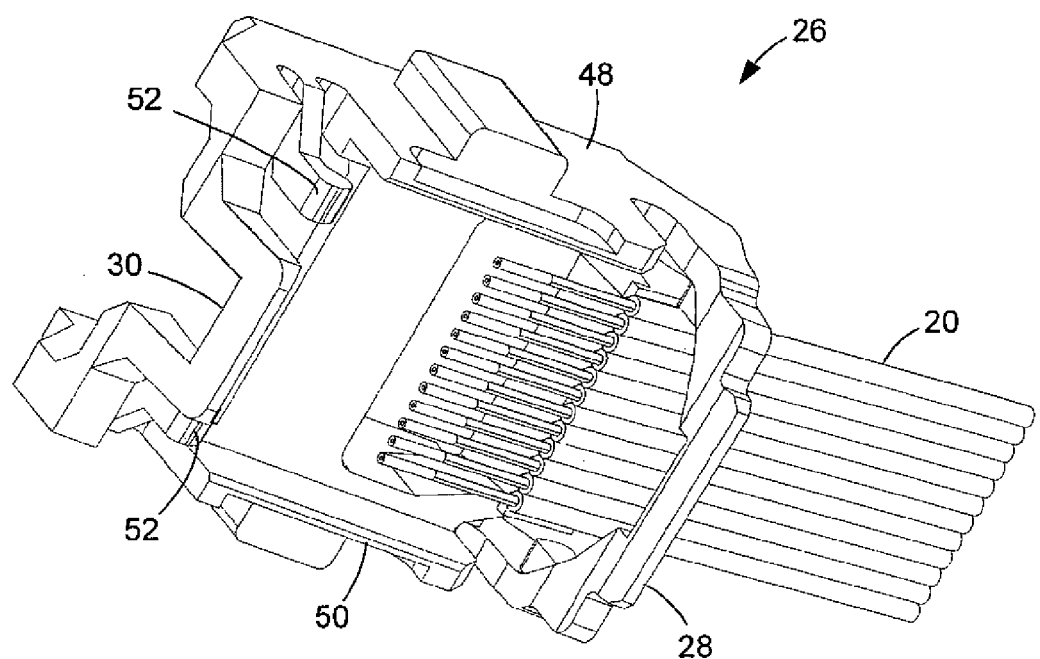
FIG. 8 is a bottom perspective view of a connector housing of FIG. 7, with a fiber-optic ribbon cable inserted.

As illustrated in FIGS. 7-8, the ends of connector housing 26 have generally U-shaped arms 28 and 30, respectively, which snap over projections 32 (FIG. 2) on parallel optical transceiver module 12 and thereby secure optical connector 10 to the top of parallel optical transceiver module 12. Thus, to attach optical connector 10 to parallel optical transceiver module 12, optical connector 10 is lowered (FIG. 2) onto the top of parallel optical transceiver module 12 and pressed downwardly until bosses 44 enter bores 46 and arms 28 and 30 snap over projections 32, resulting in the attached configuration shown in FIG. 1.

Connector housing 26 further includes two sides 48 and 50. Arm 28 joins sides 48 and 50 together at a first end of connector housing 26, and arm 30 joins sides 48 and 50 together at a second end of connector housing 26. A pair of snap-engagement fingers 52 project from the bottom portion of sides 48 and 50 near the second end of connector housing 26. A retaining portion 54 of connector housing 26 further joins sides 48 and 50 together at the first end of connector housing 26, thus bridging the open end of the U-shape of arm 28 and defining an opening in the first end of connector housing 26. The bottom of retaining portion 54 has trough-shaped parallel grooves that correspond to those that define the individual fiber guides of the array of elongated distal fiber guides 38.

As illustrated in FIG. 8, to assemble connector 10, the end of fiber-optic ribbon cable 20 is first threaded through the above-referenced opening at the first end of connector housing 26. In other embodiments (not shown) in which the optical fibers are individual or separate rather than together in the form of a ribbon cable, the individual optical fibers are inserted in the opening in essentially the same manner. Note that the end of each optical fiber of fiber-optic ribbon cable 20 is not only stripped of its protective outer jacket but also stripped of its cladding, leaving only the exposed fiber cores at the extreme end of fiber-optic ribbon cable 20.

Figure 9:
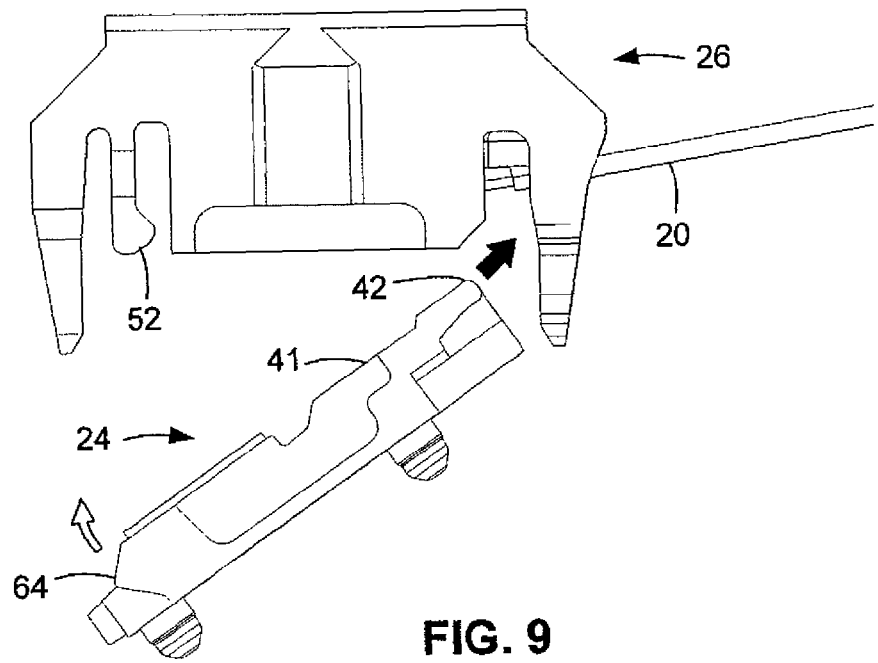
FIG. 9 is a side elevation view showing the optics device approaching the connector housing in the assembly process.
Figure 10:
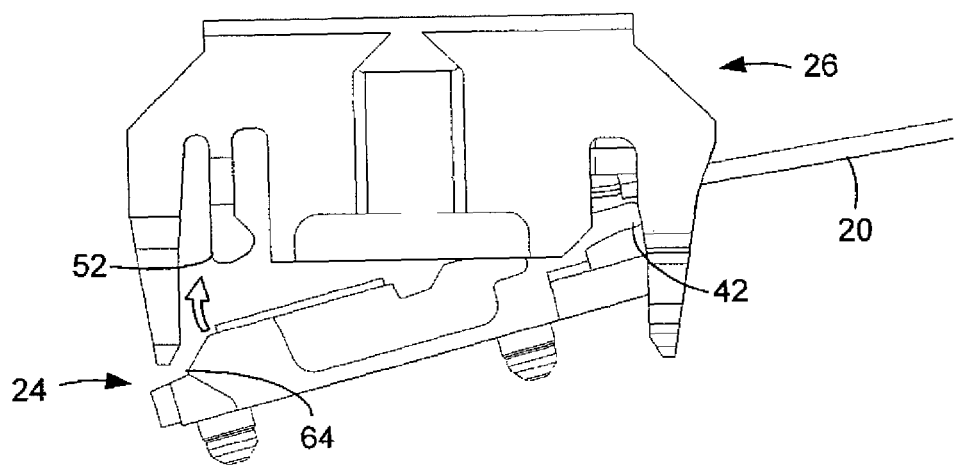
FIG. 10 is a side elevation view similar to FIG. 9, showing the optics device beginning to engage the connector housing in the assembly process.

As illustrated in FIG. 9, the assembly method proceeds by positioning optics device 24 underneath connector housing 26 and directing cam followers 42 toward the first end of connector housing 26. As illustrated in FIG. 10, as optics device 24 approaches connector housing 26 in this manner, the end of fiber-optic ribbon cable 20 enters or becomes inserted into the above-referenced fiber port 41 defined by the region in which the array of elongated parallel proximal fiber guides 36 and the array of elongated parallel distal fiber guides 38 are disposed. That is, at this stage of assembly the array of elongated parallel proximal fiber guides 36 and the array of elongated parallel distal fiber guides 38 are disposed just beneath the end of fiber-optic ribbon cable 20. Stated conversely, at this stage of assembly the end of fiber-optic ribbon cable 20 hangs just above the array of elongated parallel proximal fiber guides 36 and the array of elongated parallel distal fiber guides 38. As shown in FIG. 9, optics device 24 is oriented at an angle with respect to connector housing 26 as optics device 24 is brought nearer (FIG. 10) to connector housing 26, such that the end of optics device 24 having cam followers 42 is closer to the bottom of connector housing 26 than the other end of optics device 24.

Fiber-optic ribbon cable 20 is inserted into fiber port 41 until the ends of the optical fibers of fiber-optic ribbon cable 20 have passed through or above the array of elongated distal fiber guides 38 and reach the array of elongated parallel proximal fiber guides 36. As described more fully below, the optical fiber ends are extended or inserted fully through the array of elongated parallel proximal fiber guides 36 until the optical fiber ends abut the portion of optics device 24 at which reflective element 34 (FIG. 3) is disposed. It should be noted that a reference herein to fiber-optic ribbon cable 20 being inserted into fiber port 41 includes within its scope of meaning: moving optics device 24 relative to connector housing 26; moving connector housing 26 relative to optics device 24; and moving both optics device 24 and connector housing 26 relative to each other. In other words, although the assembly method is described for purposes of convenience and clarity as though connector housing 26 remains completely stationary and all of the relative movement between these elements consists of movement of optics device 24, it should be understood that either or both of optics device 24 and connector housing 26 can be moved to effect the assembly method.

Figure 11:
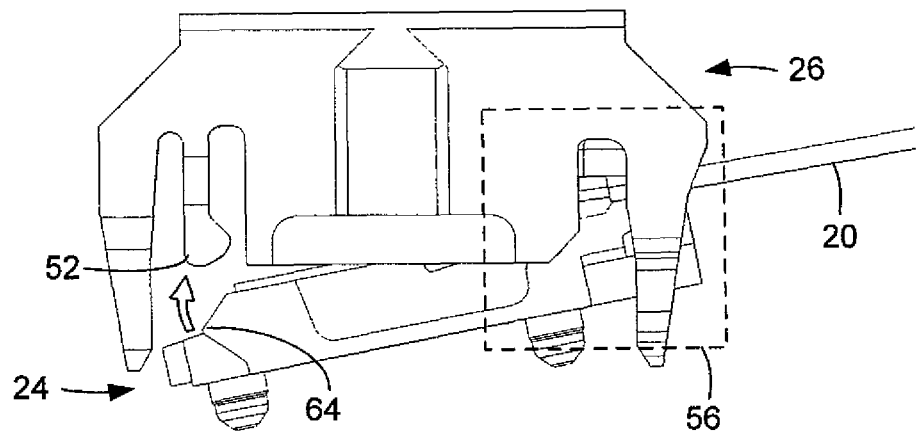
FIG. 11 is a side elevation view similar to FIGS. 9-10, showing the optics device more fully engaging the connector housing in the assembly process.
Figure 12:
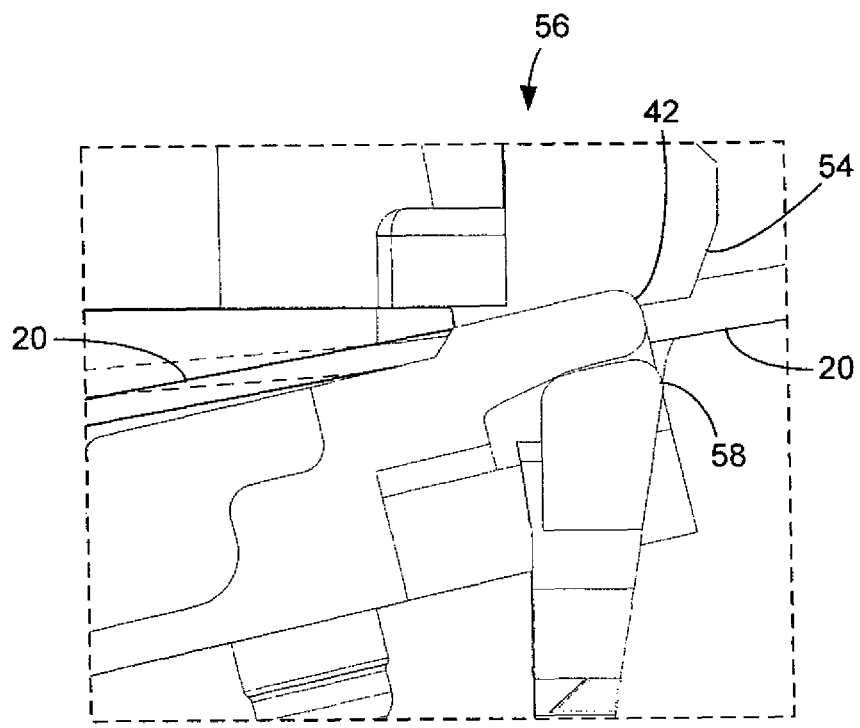
FIG. 12 is an enlargement of a portion of FIG. 11, sectioned to show the cam engagement.

As illustrated in FIG. 11 and the enlarged portion 56 thereof shown in section in FIG. 12, the first portion of optics device 24 to make contact with connector housing 26 is the pair of cam followers 42, which slide over the tops of respective cam portions 58 of connector housing 26. This camming action or engagement between cam portions 58 and cam followers 42 retains a portion of fiber-optic ribbon cable 20 between the array of elongated parallel distal fiber guides 38 of optics device 24 and retaining portion 54 of connector housing 26. Thus, a short section or portion of each optical fiber becomes seated or retained within a respective one the fiber guides of the array of elongated parallel distal fiber guides 38.

Figure 13:
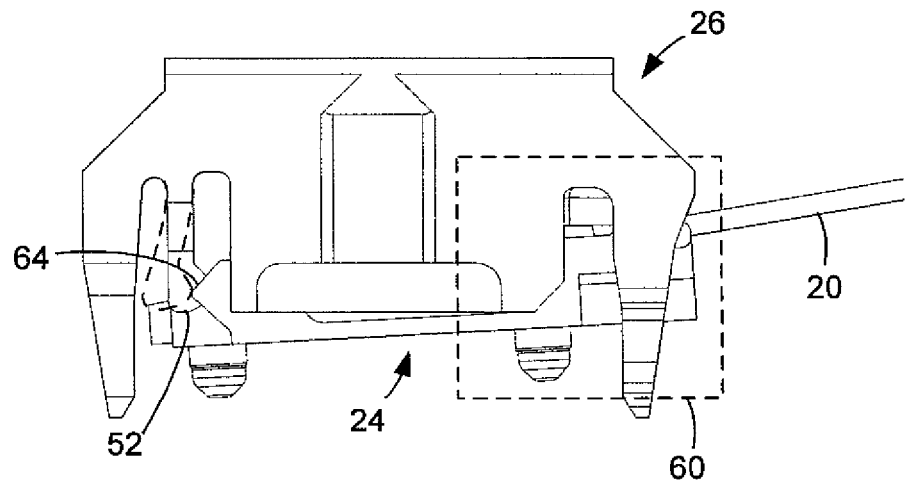
FIG. 13 is a side elevation view similar to FIGS. 9-11, showing the optics device nearly fully engaging the connector housing in the assembly process.
Figure 14:
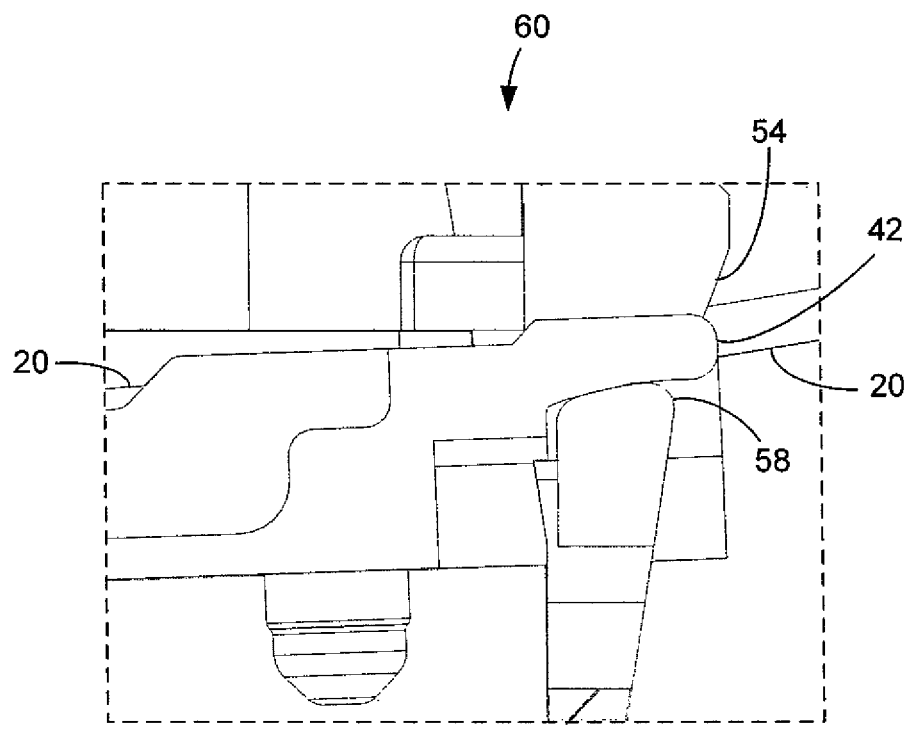
FIG. 14 is an enlargement of a portion of FIG. 13, sectioned to show the cam engagement.

As illustrated in FIG. 13 and the enlarged portion 60 thereof shown in section in FIG. 14, the above-referenced camming action continues as optics device 24 and connector housing 26 are brought further together. Note that as optics device 24 and connector housing 26 are brought further together they assume an increasingly parallel orientation relative to each other, in contrast with the angled orientation noted above with regard to, for example, FIG. 9. That is, the relative angle decreases as cam portions 58 and cam followers 42 move increasingly into engagement with each other. Stated another way, this cam engagement defines a pivot between optics device 24 and connector housing 26. The distance or gap between the array of elongated distal fiber guides 38 and retaining portion 54 decreases as optics device 24 and connector housing 26 are pivoted closer to a parallel orientation. Accordingly, as optics device 24 and connector housing 26 are further engaged with one another the above-referenced portion of fiber-optic ribbon cable 20 becomes increasingly enclosed within this gap and thus becomes further seated or retained within the array of elongated parallel distal fiber guides 38.

Figure 15:
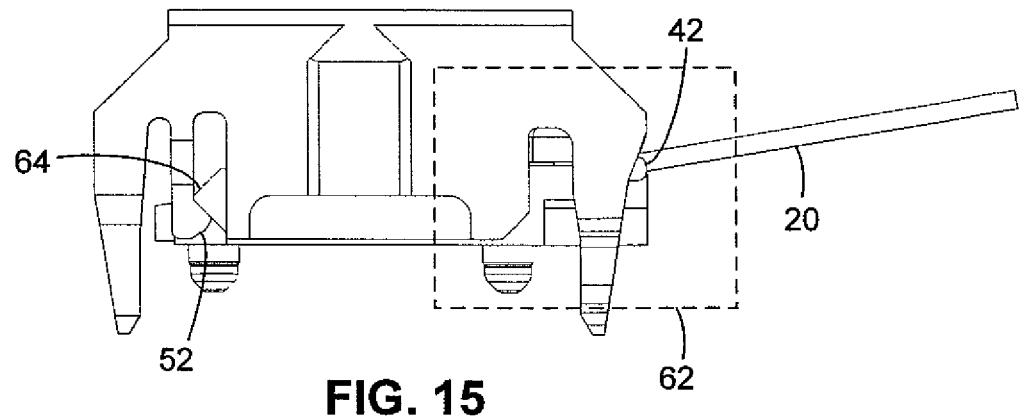
FIG. 15 is a side elevation view similar to FIGS. 9-10, showing the optics device fully engaged with the connector housing in the assembly process.
Figure 16:
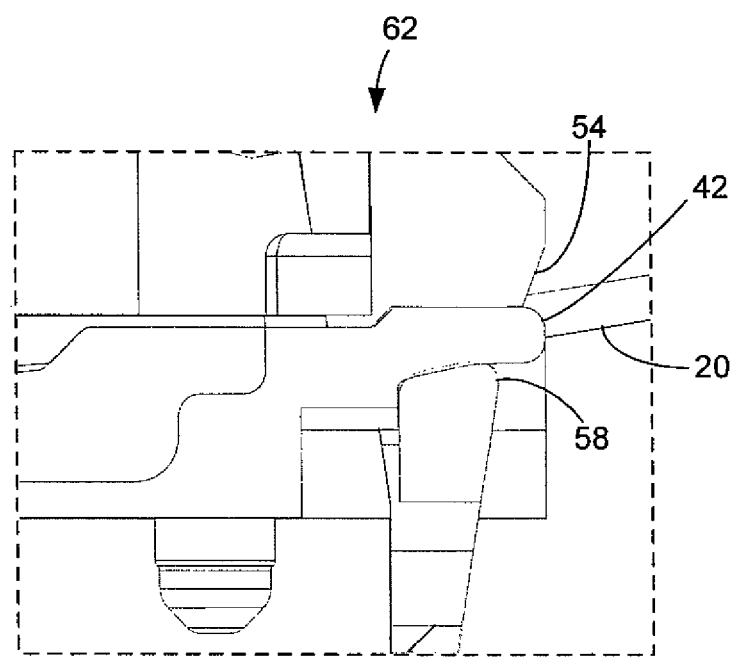
FIG. 16 is an enlargement of a portion of FIG. 15, sectioned to show the cam engagement.

The above-described pivoting between optics device 24 and connector housing 26 also decreases the distance between the optical fiber ends of fiber-optic ribbon cable 20 and the array of elongated proximal fiber guides 36. The optical fiber ends hang freely (FIG. 8) until the pivoting brings the array of elongated proximal fiber guides 36 and the optical fiber ends into contact with one another, thereby seating and retaining the optical fiber ends within corresponding fiber guides of the array of elongated parallel proximal fiber guides 36. In FIG. 15 and the enlarged portion 62 thereof shown in section in FIG. 16, the optical fiber ends of fiber-optic ribbon cable 20 are shown fully seated and retained in the array of elongated parallel proximal fiber guides 36. As optics device 24 and connector housing 26 are pivoted into the position shown in FIGS. 15-16, snap-engagement fingers 52 and two corresponding projections 64 at the second end of connector housing 26 contact each other, causing snap-engagement fingers 52 to flex (indicated in broken line in FIG. 13) and then snap back into engagement with projections 64 when optics device 24 and connector housing 26 reach the fully engaged or connected position shown in FIGS. 15-16.

Importantly, once the above-described pivoting brings the array of elongated proximal fiber guides 36 and the optical fiber ends into initial contact with one another as described above, further pivoting causes the optical fiber ends of fiber-optic ribbon cable 20 that are at first very lightly retained in the array of elongated parallel proximal fiber guides 36 to bend or flex relative to the portion of fiber-optic ribbon cable 20 that is retained within the array of elongated parallel distal fiber guides 38. As the optical fibers of fiber-optic ribbon cable 20 are resilient or springy when flexed, the optical fiber ends exert a resilient force upon the array of elongated parallel proximal fiber guides 36. Accordingly, this (at first very light) retention force increases with further pivoting and thus further flexure of fiber-optic ribbon cable 20 until optics device 24 and connector housing 26 reach the fully engaged or connected position shown in FIGS. 15-16.

Figure 17:
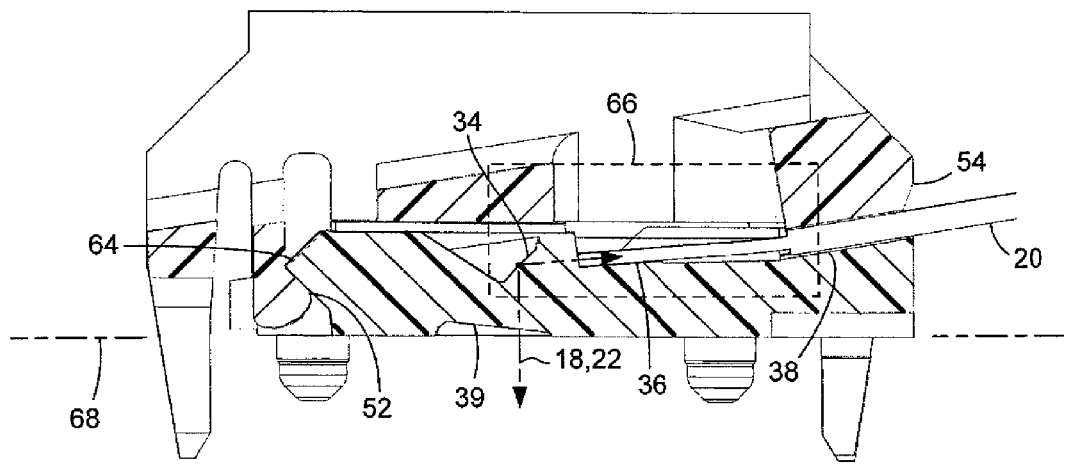
FIG. 17 is a sectional view taken on line 17-17 of FIG. 2.
Figure 18:
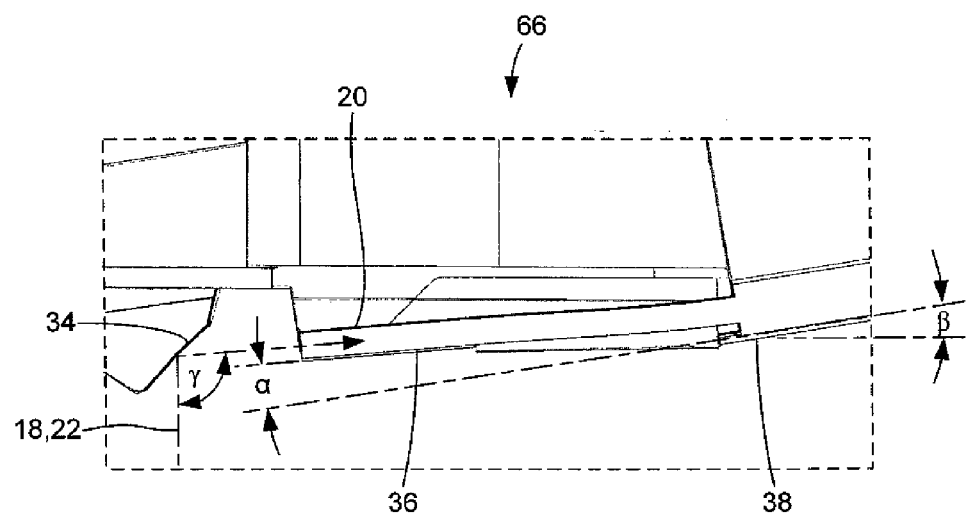
FIG. 18 is an enlargement of a portion of FIG. 16.

As illustrated in FIG. 17 and the enlarged portion 66 thereof shown in FIG. 18, the array of elongated parallel proximal fiber guides 36 and the array of elongated parallel distal fiber guides 38 are oriented at an angle α (alpha) with respect to each other. Thus, when the optical fiber ends of fiber-optic ribbon cable 20 are retained in the array of elongated parallel proximal fiber guides 36 and another portion of fiber-optic ribbon cable 20 is retained in the array of elongated parallel distal fiber guides 38 as shown in FIGS. 17-18, the optical fiber ends retained in the array of elongated parallel proximal fiber guides 36 are flexed at an angle of α with respect to the portion of fiber-optic ribbon cable 20 retained in the array of elongated parallel distal fiber guides 38. The angle α is selected to provide a sufficient preload (force) to hold the optical fiber ends in the array of elongated parallel proximal fiber guides 36. The angle α can be in the range, for example, from about 2 degrees to 15 degrees. This flexure of fiber-optic ribbon cable 20 can correspond to fiber-optic ribbon cable 20 having a radius of curvature of, for example, approximately one inch between the optical fiber ends retained in the array of elongated parallel proximal fiber guides 36 and the portion of fiber-optic ribbon cable 20 retained in the array of elongated parallel distal fiber guides 38 (i.e., the portion of fiber-optic ribbon cable 20 within fiber port 41).

It can also be noted in FIGS. 17-18 that the array of elongated parallel distal fiber guides 38 are oriented at an angle of β (beta) with respect to a "horizontal" reference plane 68. Reference plane 68 is horizontal in the sense that it is substantially parallel to the bottom portion of optical connector 10 and thus also substantially parallel to the surface of PCB 14 (FIG. 1) when the bottom of optical connector 10 is mounted on the top of parallel optical transceiver module 12. Furthermore, it can be noted in FIG. 18 that the axes of optical signals 18 and 22 beneath optics device 24 are perpendicular or normal to reference plane 68. Reflective element 34 redirects optical signals 18 and 22 at an angle of γ (gamma) between the direction normal to reference plane 68 and the (axes of the) optical fiber ends. The angle γ at which reflective element 34 redirects optical signals 18 and 22 is at least about 90 degrees and can be as great as, for example, about 135 degrees. The angle β at which fiber-optic ribbon cable 20 enters optical connector 10 (i.e., enters fiber port 41) can be as shallow as only a few degrees or as great as, for example, nearly 90 degrees.

In operation, optical signals 18 that optical connector 12 receives from parallel optical transceiver module 12 are reflected or redirected at an angle of γ by reflective element 34 into the optical fiber ends. Similarly, optical signals 22 that optical connector 12 receives from the optical fiber ends are reflected or redirected at an angle of γ by reflective element 34 into parallel optical transceiver module 12. Anti-reflection optic 39 (FIGS. 4 and 17) comprises a cavity or recess in the bottom surface of optics device 24 and has a surface oriented at a slight angle to the axes of optical signals 18 and 22, thereby redirecting reflections in a harmless direction.

Figure 19:
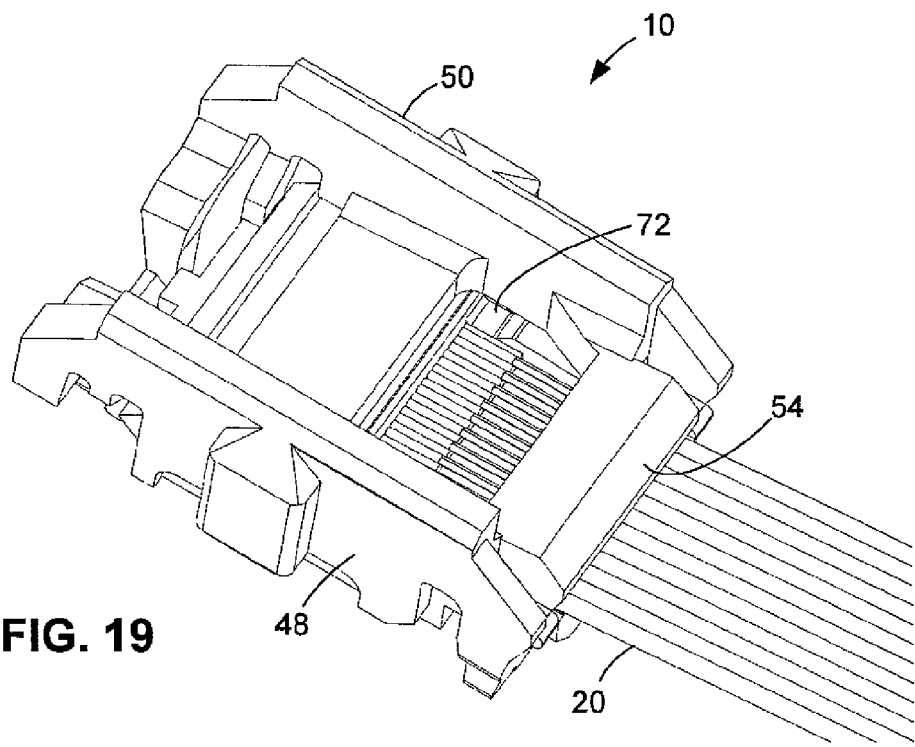
FIG. 19 is a top perspective view of the fully assembled optical connector prior to applying adhesive.
Figure 20:
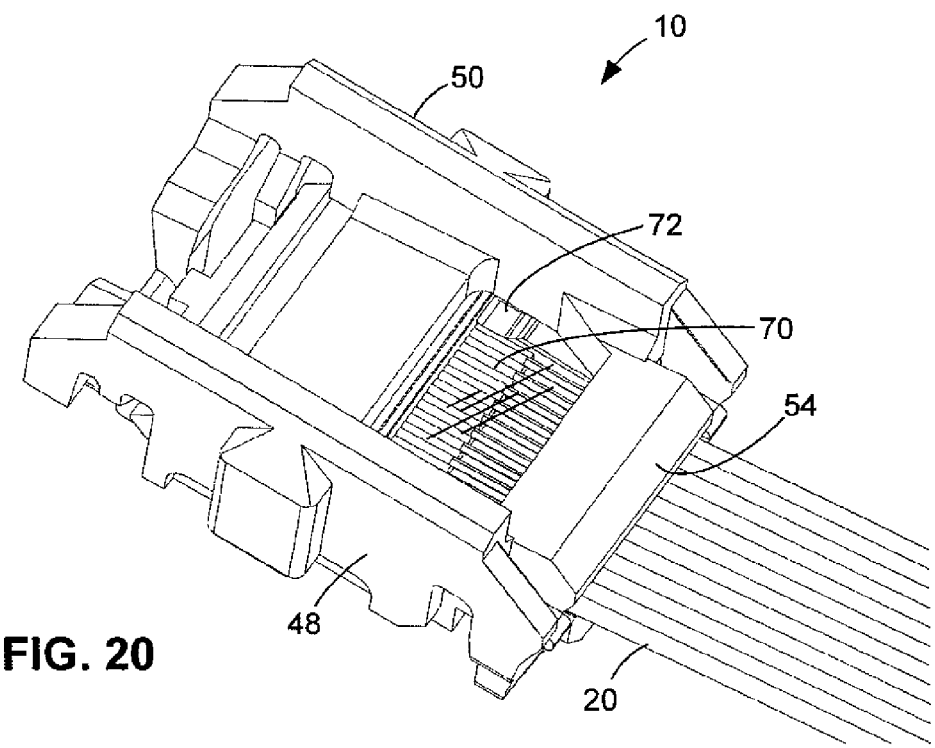
FIG. 20 is a top perspective view of the fully assembled optical connector after applying adhesive.

As illustrated in FIG. 19, once optics device 24 and connector housing 26 have been fully connected, the optical fiber ends are retained in the array of elongated parallel proximal fiber guides 36 by the resiliency or spring force of the flexed optical fiber ends. As illustrated in FIG. 20, while the optical fiber ends are temporarily retained by this force, they can be more permanently secured by applying a layer of adhesive 70 to the region in which the optical fiber ends are disposed. The layer of adhesive 70 can be applied in liquid form and allowed to cure or harden. The layer of adhesive 70 not only adheres the optical fiber ends to the array of elongated parallel proximal fiber guides 36 but also adheres portions of optics device 24 to portions of connector housing 26 because the liquid flows into areas in which such portions adjoin or abut each other. For example, some of the liquid adhesive can flow through a pair of troughs or channels 72 in optics device 24 into recesses 74 (FIGS. 3-6) in the sides of optics device 24. In the assembled connector 10, the adhesive within recesses 74 adheres the sides of optics device 24 to adjoining portions of sides 48 and 50 of connector housing 26. When the adhesive cures or hardens, connector 10 cannot readily be disassembled, and fiber-optic ribbon cable 20 is effectively locked to connector 10.

The optical fiber ends are embedded in the layer of adhesive 70, because the liquid adhesive pools or builds up a thickness or depth in the area of the array of elongated parallel proximal fiber guides 36. The liquid adhesive flows into any voids around the optical fiber ends, including any gaps between optical fiber ends and the portion of optics device 24 that they abut. The liquid adhesive also flows into any imperfections in the optical fiber ends. It is not uncommon for a cleaved but unpolished optical fiber end (face) to include imperfections resulting from the cleaving. To promote optical signal transmission between the optical fiber end and optics device 24, the adhesive has an index of refraction matching that of the material of which optics device 24 is made and is transparent to the optical signal wavelengths.

One or more illustrative embodiments of the invention have been described above. However, it is to be understood that the invention is defined by the appended claims and is not limited to the specific embodiments described. For example, although the above-described embodiment relates to an optical connector that is attachable to an optical transceiver module, in other embodiments such an optical connector can be attachable to an optical transmitter module, an optical receiver module, or any other suitable type of optical communication module. Also, for example, although the above-described embodiment relates to an optical connector that retains a ribbon cable, in other embodiments such an optical connector can retain individual fibers that are not part of a ribbon cable.

What is claimed is:

1. An optical connector attachable to an optical communication module mounted on a surface of a circuit board, comprising:
   a connector housing having a bottom portion mechanically and optically mateable with an upper portion of the optical communication module, the bottom portion defining a reference plane parallel to the surface of the circuit board when the optical connector is attached to the optical communication module;

an optics device connected to the connector housing, the optics device having a reflective element configured to redirect a plurality of parallel optical beams at an angle of at least about 90 degrees between a first axis and a second axis, the first axis oriented normal to the reference plane and extending between the reference plane and the reflective element, the second axis extending between the reflective element and a fiber port, the fiber port having a plurality of elongated parallel proximal fiber guides adjacent the reflective element and a corresponding plurality of elongated parallel distal fiber guides, the plurality of elongated parallel proximal fiber guides oriented at a non-zero angle with respect to the plurality of elongated parallel distal fiber guides.

2. The optical connector of claim 1, wherein the plurality of elongated parallel proximal fiber guides comprise a first plurality of parallel grooves, and the plurality of elongated parallel distal fiber guides comprise a second plurality of parallel grooves.

3. The optical connector of claim 2, further comprising a plurality of optical fibers retained in the fiber port, the plurality of optical fibers having a plurality of optical fiber ends aligned along the second axis and retained in the plurality of elongated proximal fiber guides, the plurality of optical fibers extending from the plurality of elongated proximal fiber guides through the plurality of elongated parallel distal fiber guides and exiting the connector housing, the plurality of optical fiber ends exerting a resilient force against the plurality of elongated parallel proximal fiber guides.

4. The optical connector of claim 3, wherein a retaining portion of the connector housing retains a portion of the plurality of optical fibers in the plurality of elongated parallel distal fiber guides.

5. The optical connector of claim 3, wherein one of the connector housing and the optics device includes a cam, and the other of the connector housing and the optics device includes a cam follower engageable with the cam to aid retention of a first end of the connector housing to a first end of the optics device.

6. The optical connector of claim 5, wherein one of the connector housing and the optics device includes a first snap engagement, and the other of the connector housing and the optics device includes second snap engagement engageable with the first snap engagement to aid retention of a second end of the connector housing to a second end of the optics device.

7. The optical connector of claim 3, further comprising adhesive securing and embedding the plurality of optical fiber ends in the plurality of elongated parallel proximal fiber guides.

8. The optical connector of claim 1, wherein the reflective element is disposed in a recess in a surface of the optics device, and a cover attached to the surfaces seals the reflective element within the recess.

9. The optical connector of claim 1, wherein the optics device further comprises an anti-reflection surface intersecting the first axis and oriented at a non-zero angle to the first axis.

10. A method for making an optical connector attachable to an optical communication module mounted on a surface of a circuit board, the method comprising:

providing a connector housing having a bottom portion mechanically and optically mateable with an upper portion of the optical communication module, the bottom portion defining a reference plane parallel to the surface of the circuit board when the optical connector is attached to the optical communication module;

providing an optics device connected to the connector housing, the optics device having a reflective element configured to redirect a plurality of parallel optical beams at an angle of at least about 90 degrees between a first axis and a second axis, the first axis oriented normal to the reference plane and extending between the reference plane and the reflective element, the second axis extending between the reflective element and a fiber port, the fiber port having a plurality of elongated parallel proximal fiber guides adjacent the reflective element and a corresponding plurality of elongated parallel distal fiber guides; and inserting a plurality of optical fibers into the fiber port past the plurality of distal fiber guides until a plurality of optical fiber ends of the plurality of optical fibers reach the plurality of elongated parallel proximal fiber guides; and securing the plurality of optical fibers in the fiber port in an orientation wherein the plurality of optical fiber ends are retained in the plurality of the elongated parallel proximal fiber guides and aligned along the second axis, and a portion of the plurality of optical fibers is retained in the plurality of elongated parallel distal fiber guides in an orientation at a non-zero angle with respect to the second axis.

11. The method of claim 10, wherein securing the plurality of optical fibers in the fiber port comprises securing the portion of the plurality of optical fibers against flexure while flexing the plurality of optical fiber ends into exerting a resilient force against the plurality of elongated parallel proximal fiber guides with respect to a retained portion of the plurality of optical fibers.

12. The method of claim 10, wherein the plurality of the elongated parallel proximal fiber guides comprise a first plurality of parallel grooves, the plurality of the elongated parallel distal fiber guides comprise a second plurality of parallel grooves, and securing the plurality of optical fibers in the fiber port comprises seating the plurality of optical fiber ends in first plurality of parallel grooves and seating the portion of the plurality of optical fibers in the second plurality of parallel grooves.

13. The method of claim 10, further comprising applying an adhesive to secure and embed the plurality of optical fiber ends in the plurality of elongated parallel proximal fiber guides.

14. The method of claim 13, wherein applying an adhesive comprises applying an adhesive to fill a void in which the in which proximal fiber guides are disposed and in which the connector housing adjoins the optics device, wherein the adhesive simultaneously adheres the connector housing to the optics device and secures and embeds the plurality of optical fiber ends in the plurality of the proximal fiber guides.

15. The method of claim 10, wherein one of the connector housing and the optics device includes a cam, and the other of the connector housing and the optics device includes a cam follower, and securing the plurality of optical fibers in the fiber port comprises engaging the cam and the cam follower.

16. The method of claim 15, wherein one of the connector housing and the optics device includes a first snap engagement, and the other of the connector housing and the optics device includes second snap engagement, and securing the plurality of optical fibers in the fiber port further comprises engaging the second snap engagement with the first snap engagement.

17. The method claim 16, wherein the cam follower comprises a pair of projections extending from an end of the optics device, and the cam comprises a pair of slots in the connector housing, and securing the plurality of optical fibers in the fiber port comprises engaging the pair of projections in the pair of slots to form a pivoting cam engagement and then pivoting the optics device until the first snap engagement engages the second snap engagement.

\* \* \* \* \*